(No Model.) 3 Sheets—Sheet 2.

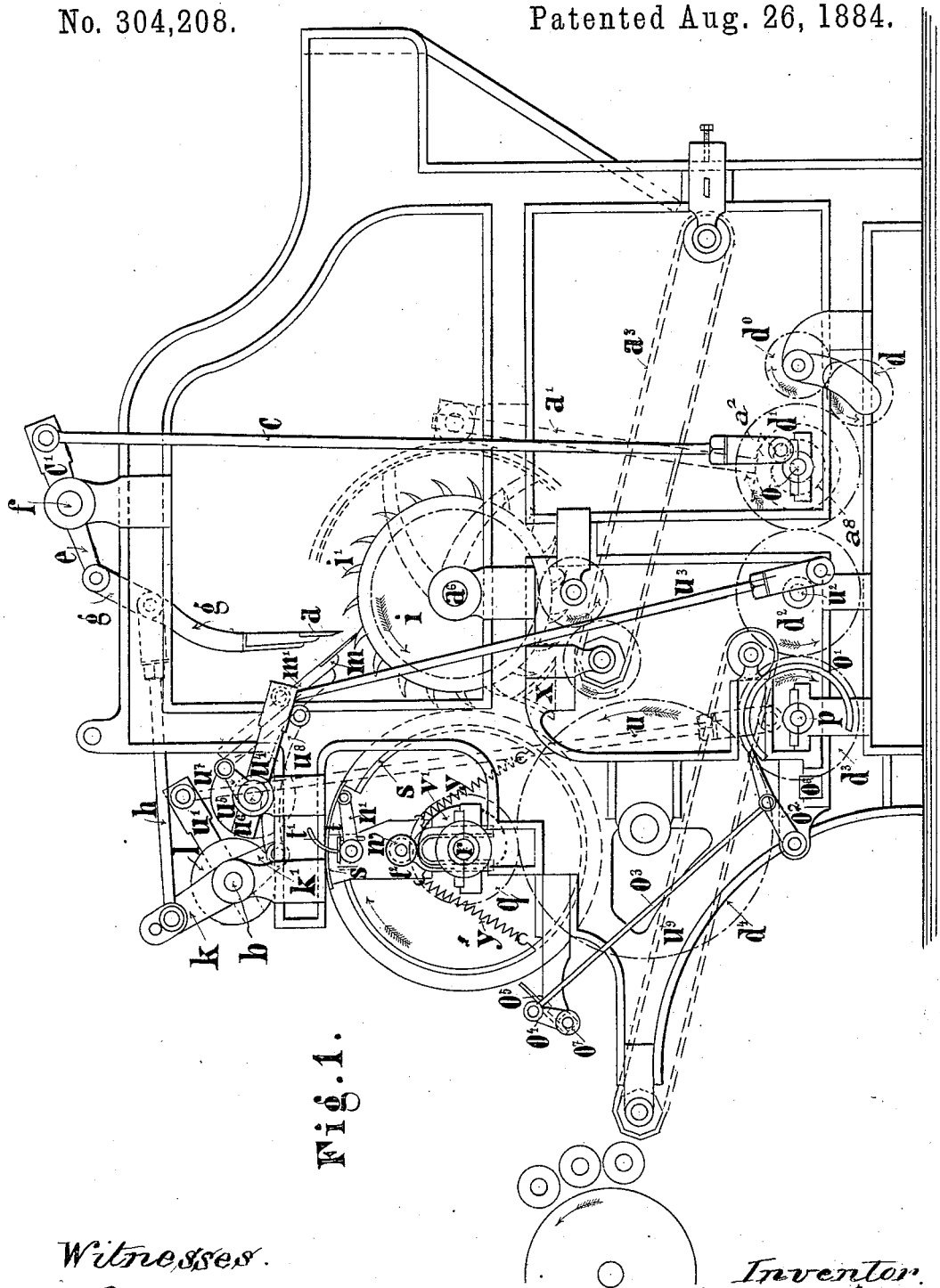

J. T. LEMAIRE.
FEEDING APPARATUS FOR CARDING ENGINES.

No. 304,208. Patented Aug. 26, 1884.

Witnesses
J. Gemmel, Jr.
C. Paulo

Inventor
Jean Thomas Lemaire
per Henry E. Roeder
Attorney

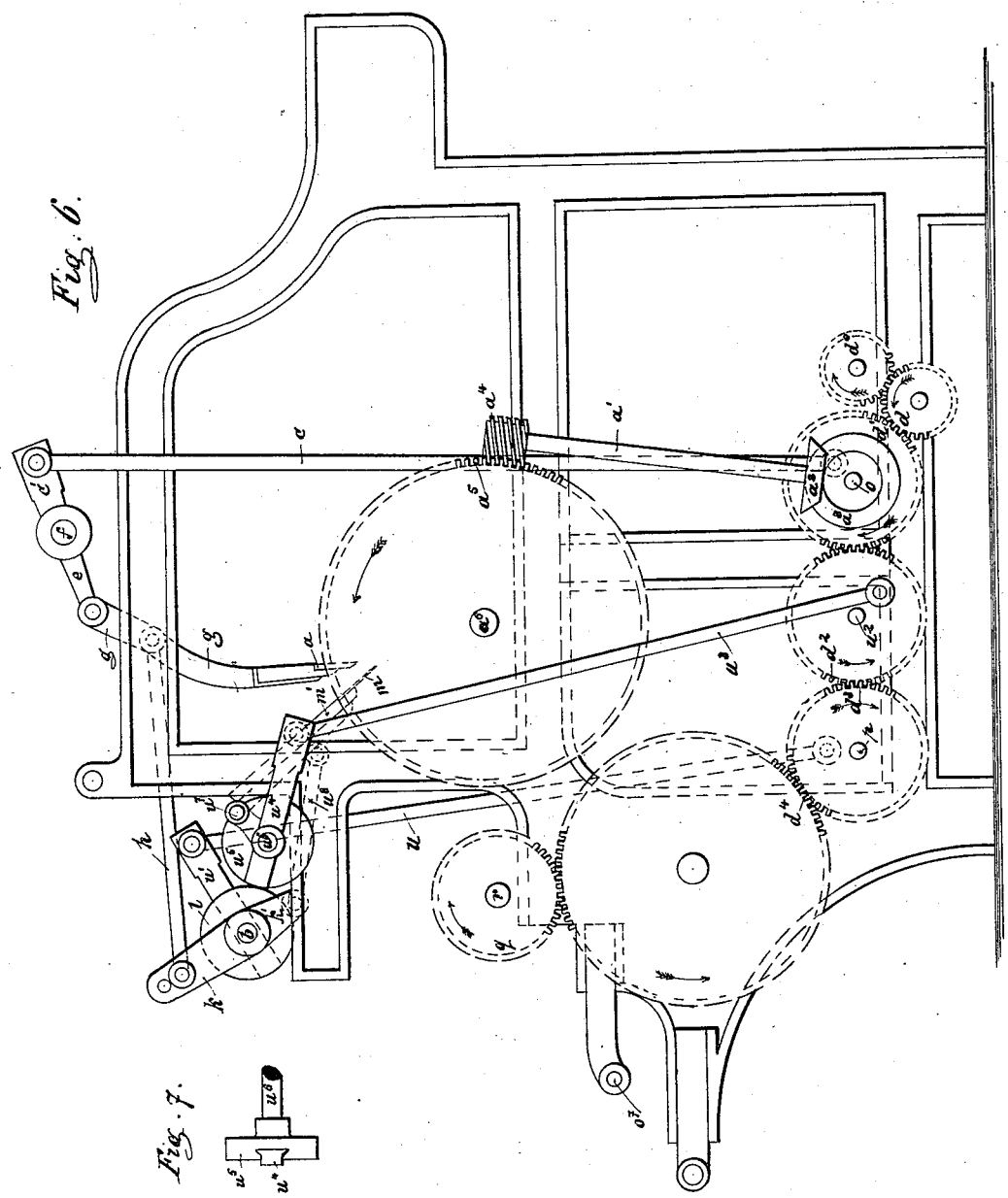

UNITED STATES PATENT OFFICE.

JEAN T. LEMAIRE, OF HODIMONT-VERVIERS, BELGIUM, ASSIGNOR TO A. CRÉMER PIRNAY & CO., OF SAME PLACE.

FEEDING APPARATUS FOR CARDING-ENGINES.

SPECIFICATION forming part of Letters Patent No. 304,208, dated August 26, 1884.

Application filed July 27, 1883. (No model.)

*To all whom it may concern:*

Be it known that I, JEAN THOMAS LEMAIRE, a subject of the King of Belgium, residing at Hodimont-Verviers, in the Kingdom of Belgium, have invented a new and useful Feeding Apparatus for Carding-Engines, of which the following is a specification.

My invention relates to feeding devices for carding-engines of the class shown in Letters Patent No. 255,519, granted to me on March 28, 1882; and the object of my invention is to deliver the fleece in a more convenient way from the collecting-cylinder to the carding-engine.

Figure 4:
Figure 5:
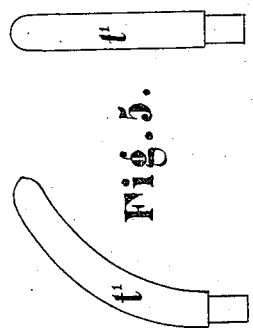
Figure 3:
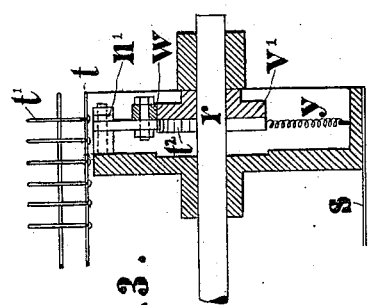
Figure 2:
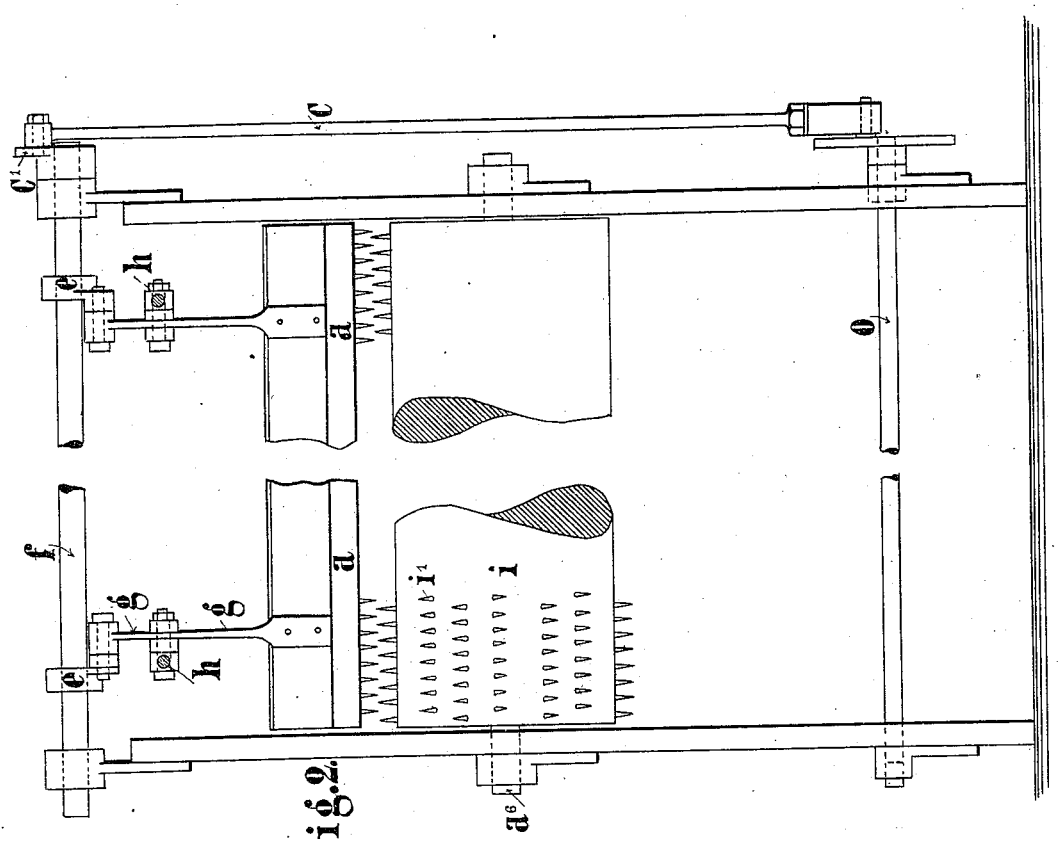

In the accompanying drawings, Figure 1 shows a side view of the apparatus, with the driving gear indicated in dotted lines. Fig. 2 is a cross-section of the same in front of the collecting-cylinder $i$. Figs. 3, 4, 5, and 7 are details. Fig. 6 is a side view of the apparatus, representing the driving-gear of the several shafts.

Similar letters represent similar parts in all the figures.

By toothed wheels $d^0$ $d$ $d'$ motion is imparted to the shaft $o$, and from the latter to the shaft $a^6$ by means of shaft $a'$, having at its lower end bevel-gear $a^2$, meshing into a corresponding bevel-gear, $a^3$, secured upon the end of the shaft $o$. At the upper end of the shaft $a'$ is fastened a worm-wheel, $a^4$, meshing in the wheel $a^5$, attached to the shaft $a^6$.

On the shaft $o$ a toothed wheel, $d'$, is attached, connected through the train of toothed wheels $d^2$ $d^3$ $d^4$ with the toothed wheel $q$, attached to the shaft $r$, thereby giving the desired motion to said shaft $r$, as well as to the shafts $u^2$ and $p$, upon which wheels $d^2$ and $d^3$, respectively, are fixed. The wheels $d'$, $d^2$, $d^3$, and $q$ are of the same diameters, in consequence of which their respective shafts $o$, $u^2$, $p$, and $r$ are turned at the same speed. The revolution of the shaft $o$, which is connected through a rod, $c$, to a lever, $c'$, communicates a rocking motion to said lever $c'$. This lever $c'$ is attached to a shaft, $f$, upon which shaft $f$ levers $e$ are fixed, to the ends of which levers $g$ are attached, bearing at their lower ends the comb $a$. The connecting-rod $h$ unites the levers $g$ with levers $k$, fixed on a shaft, $b$. Upon this shaft $b$ a plate, $l$, is keyed, provided with a lever, $u'$, which can be adjusted in a slot or groove in the plate $l$, and whereby the motion of the shaft $b$ can be increased or diminished. The plate $l$ is identical in its general construction with the plate $u^5$ and groove. (Shown in Fig. 7.) The connecting-rod $u$ communicates motion from the rotary shaft $p$ to this lever $u'$, producing thereby a rocking motion from the rotary shaft $p$ to lever $u'$, and an oscillating motion of the shaft $b$. By this oscillating motion of the shafts $f$ and $b$, communicated both to the levers $g$, in the manner above described, an elliptic motion is produced on the lever $g$, and consequently of the comb $a$. The rotation of the shaft $u^2$ is communicated by the connecting-rod $u^3$ to a lever, $u^4$, adjustable in a slot or groove in the plate $u^5$. (See Fig. 7.) This plate $u^5$ is keyed upon a shaft, $u^6$, which latter receives, therefore, an oscillatory motion. The shaft $u^6$ carries levers $u^7$, to which the end of a flat plate, $m'$, is hinged, the lower end of which plate is united by a connecting-rod, $u^8$, to the lever $k'$, fast on the shaft $b$. By this arrangement the lower end of the plate $m'$, to which the regulating-comb $m$ is attached, receives an elliptic motion.

Upon the shaft $a^6$ a collecting-cylinder, $i$, is keyed, the circumference of which is provided with curved and tapering teeth $i'$. (Shown in detail in Fig. 4.) These teeth $i'$ catch the fibrous material furnished by the apron $a^3$ and bring it to the regulating-comb $m$, which describes, as above mentioned, an elliptic motion, whereby, while said comb $m$ is made to pass near the periphery of the revolving collecting-cylinder $i$, upon which the material adhering to its teeth $i'$ is carried toward it, the teeth of said comb $m$ will lay the fibers of the wool parallel to each other. The function of the comb $a$, which, as above described, has likewise an elliptic motion, is to take from the collecting-cylinder $i$ the surplus of wool, as also to clear the material from comb $m$, avoiding thereby the felting of the fibrous material. The fibrous material is, after being combed by the comb $m$, withdrawn from the teeth of the collecting-cylinder $i$ by the teeth $t'$, (shown in detail in Fig. 5,) which conduct the wool over the isolator $x$ and let it drop finally, by a mechanism described hereinafter, on the endless apron $w^9$, which transports the wool to the carding-engine. The teeth $t'$ project through holes $s'$ of the drum $s$, made of sheet-iron and keyed upon the shaft $r$.

In the interior of the drum $s$ an angle-iron bar, $t$, is arranged, running the whole length of said drum $s$, to which the teeth $t'$ are riveted. (See Fig. 3.) The angle-iron bar $t$ rests upon the pieces $t^2$, and is attached to the same.

Below the angle-iron bar $t$ links $n'$ are attached to the piece $t^2$, the other ends of said links being hinged to the sides of the drum $s$. By these links the upper parts of the pieces $t^2$ are guided. The lower forked parts of the pieces $t^2$ surround the shaft $r$, and are guided on the same.

To the pieces $t^2$ loose rollers $w$ are fastened, running upon cams $v'$, rigidly united with the plumber-block of the shaft $r$. In the position shown in the drawings the rollers $w$ are beginning to pass over the elevated part of the cam $v'$. The pieces $t^2$, to which the angle-iron bar $t$ is attached, are therefore lifted, and the teeth $t'$ are projected far enough from the periphery of the drum $s$ to take the wool from the teeth of the collecting-cylinder $i$. During the continued revolution of the drum $s$ the teeth $t'$ remain in such position till the rollers $w$ enter, by tension of the spiral springs $y$, the recessed part of the cam $v'$, when the pieces $t^2$, together with angle-iron bar $t$ and teeth $t'$, will be moved inward, so as to bring the teeth $t'$ inside the periphery of the drum $s$. The teeth $t'$ recoiling into the interior of the drum $s$, let drop the wool on the endless apron $w^9$, which carries the same to the carding-engine. A leather strap, $o^5$, extending transversely of the machine, and of a length equal to the width of the drum $s$, is secured to a shaft, $o^7$, and touches with a violent downward stroke the teeth $t'$ just at the moment they enter the drum $s$, thereby assisting the teeth in letting drop the wool. This downward motion of the leather strap $o^5$ is produced by the following mechanism: On the shaft $p$ a cam-disk, $o'$, is fixed, upon which rests the lever $o^2$, Fig. 1, turning on a suitable pivot, and connected by rod $o^3$ with the lever $o^4$, attached upon shaft $o^7$. The lever $o^4$ and the leather strap $o^5$ will therefore strike downward as soon as the open part of the cam-disk $o'$ comes during its revolution under the lever $o^2$. The violence of this downward motion of the lever $o^2$ is softened by an india-rubber cushion, $o^6$, attached to the frame of the machine, and upon which the lever $o^2$ strikes in its downward motion.

The operation of the machine is as follows: The wool or fibrous material furnished by the apron $a^3$, and carried toward the collecting-cylinder $i$ in the usual manner, is taken up by the teeth $i'$, attached to said cylinder, when, as the material is carried around by the revolution thereof, the comb $a$ will remove the surplus of the wool from the teeth $i'$, after which the regulating-comb $m$ will lay the fibers of the wool parallel to each other. The fibrous material is then brought toward the cylinder $s$, when the teeth $t'$, arranged in said cylinder, will withdraw the material, and conducting the same over the isolator $x$, let it drop finally on the endless apron $w^9$, in the manner described, and which latter transports the wool to the carding-engine.

What I claim as my invention, and desire to secure by Letters Patent, is—

1. The combination, with the comb $a$, levers $g$, levers $e$, shaft $f$, levers $c'$, connecting-rod $c$, and shaft $o$, of the rod $h$, lever $k$, shaft $b$, plate $l$, movable lever $u'$, connecting-rod $u$, and shaft $p$, and means for imparting motion from shafts $o$ and $p$ to connecting-rods $c$ and $u$, respectively, arranged to operate in the manner and for the purpose described.

2. The comb $m$ and plate $m'$, lever $u^7$, shaft $u^6$, plate $u^5$, movable lever $u^4$, connecting-rod $u^3$, and shaft $u^2$, in combination with connecting-rod $u^8$, lever $k'$, shaft $b$, plate $l$, movable lever $u'$, connecting-rod $u$, and shaft $p$, and means for imparting motion from shafts $u^2$ and $p$ to connecting-rods $u^3$ and $u$, respectively, arranged to operate as and for the purpose set forth.

3. The combination of shaft $r$, drum $s$, having holes $s'$ therein, toothed wheel $q$, and means for revolving the same, cams $v'$, pieces $t^2$, springs $y$, links $n'$, angle-iron bar $t$, and teeth $t'$, secured thereto, and projecting through the holes $s'$ of drum $s$, substantially as and for the purpose set forth.

4. The combination of the leather strap $o^5$, shaft $o^7$, lever $o^4$, connecting-rod $o^3$, lever $o^2$, the partially-open cam-disk $o'$, shaft $p$, and the india-rubber cushion $o^6$, all as described, and for the purpose specified.

In testimony whereof I have hereto set my hand this 28th day of June, 1883.

JEAN TH. LEMAIRE.

Witnesses:
LEONARD RENSONNET,
P. LEJEUNE.